Patented Nov. 4, 1947

2,430,404

UNITED STATES PATENT OFFICE 2,430,404

HEAT-RESISTANT COMPOSITION

William A. MacFarland, Bridgewater, and Charles H. Cutter, Wellesley, Mass.

No Drawing. Application May 20, 1943, Serial No. 487,818

1 Claim. (Cl. 106—220)

The present invention relates to new composition of matter.

The object of the present invention is to provide a new composition of matter which in its different specific forms possesses certain various attributes which adapt it particularly for one or another of a variety of uses. Thus, in one form it is especially useful as a coating composition or paint, inasmuch as it is heat resistant, even to long continued, exceedingly high temperatures. It is also unaffected by substantially all known acids, alkalis, and other corrosive and destructive substances.

Another specific form of the present invention is as a plastic which may be applied as a cement or may be molded into any desired shape for a wide variety of uses by reason of its strength, wear resistance, chemical inertness, heat insulation qualities, and electrical characteristics.

Still another specific form of the new composition is as a compound of rubber or the like to provide a flexible or yielding wear surface such as the tread of vehicle tires, shoe soles and heels, floor and stair coverings. Such a composition or compound is not only most resistant to wear, but it has a definite gripping or non-slip action, even when its surface is relatively smooth.

With these objects in view, the present invention consists in the composition of matter hereinafter described and more particularly defined in the claim.

In its broader aspects the present invention consists in the composition of matter resulting from the combination of dry precipitator or fly ash, as it is sometimes called, with various suitable materials selected in accordance with the use or uses to which the composition is to be put, to secure the desired characteristics to adapt it for its intended use.

Dry precipitator or fly ash, which is the essential constituent material of this new composition of matter, is the ash produced by the combustion of powdered coal and is ordinarily separated from the gases of combustion by electrostatic means, or otherwise. As collected in steam plants and the like, this fly ash is a very fine powdery material, gray in color, light in weight, and composed largely of carbon, silicates, and oxides.

We have found that this material may be combined with suitable substances to secure products which have many valuable characteristics. For example, a valuable coating composition or paint is obtained by combining dry precipitator ash with a suitable binder, the resulting product being unaffected by excessively high heat or by practically all of the known acid, alkalis, and other corrosive substances. While various forms of binder may be employed, we have found that a most satisfactory paint is produced by the use of the following materials in the proportions stated, which are on the basis of weight.

| Material | Per Cent |
|---|---|
| Fly Ash | 45 |
| Pentaerythritol Abietate | 8 |
| Dehydrated Castor Oil | 8 |
| Lead Acetate | 2 |
| Sixteen per cent Lead Naphthenate in Mineral Spirits | 6 |
| Four per cent Cobalt Naphthenate in Mineral Spirits | 3 |
| Mineral Spirits | 10 |
| V. M. & P. Naphtha | 18 |

The pentaerythritol abietate is a synthetic resin which imparts toughness to the paint film or coating; the dehydrated castor oil is to make it elastic and prevent brittleness; the lead acetate acts as a drier as do the lead and cobalt naphthenates; the mineral spirits and naphtha are the solvent for the other materials and constitute the carrier therefor. They probably also have some action as a drier.

V. M. & P. naphtha is a well known product on the market. It is between gasoline and kerosene in volatility and other characteristics.

In preparing our new coating or paint in accordance with the above formula, all of the ingredients, including the ash, are ground together for forty-eight hours in a ball mill. This secures extreme fineness of the ash. In fact the particles are so fine that they practically never settle out or separate from the liquid constituents as do the solid ingredients of ordinary paint, although the consistency of our paint is substantially the same as ordinary paint.

The improved paint produced as above described will be black in color, but if desired, pigment may be added to obtain gray or the lighter shades of other colors.

Our improved paint has great heat resistant qualities and when applied to furnaces and boilers and other metallic surfaces, will remain unchanged, still in a smooth, unbroken form, although the metal bearing it may be maintained for long periods of time at high temperatures, i. e. 800–1000 degrees F. and upwards. Preferably the paint is applied when the metal is cold or moderately warm, but it may be applied directly to the metal when the latter is at as high a temperature as the brush will stand. The surface should be dry, however, when the paint is applied thereto.

As a paint for covering, as for example, wood or cement, whether indoors or outdoors, it has many distinct advantages, being unaffected by atmospheric conditions such as heat, cold, moisture, dryness, and furthermore, is highly resistant to wear, thus particularly adapting it for floor use. It is unaffected by practically all of the known acids, alkalis, and other corrosive substances and thus forms a most efficient and permanent protective coating for metallic and other structures exposed to these destructive agents, both on the outside and on the inside of tanks and other containers.

Where our improved composition of matter is to be used as a plastic, we have found that a suitable binder for the fly ash is tri-sodium phosphate, zinc chloride, and sodium silicate in the proportions by weight approximately of 75% fly ash, 10% tri-sodium phosphate, 5% zinc chloride, and 10% sodium silicate. This produces a plastic material which may be applied as a cement or molded to any desired shape and when subjected to heat, say of 500-600 degrees F. for a period of an hour will become hard and tough, unaffected by fire, water, acids and alkalis. It may be machined, cut, and drilled, and has high insulation properties which makes it well suited for various electrical uses. Because of its resistance to wear and abrasion, it is adapted for floor coverings, such as tiles, and on account of its resistance to extreme heat, may be provided with baked enamel finish. It is also well suited for use as a wall board.

Our new composition of matter when used as a rubber compound for vehicle tires and the like, is produced by combining the fly ash with rubber and the usual other ingredients such as carbon black, sulfur, etc. and a greatly reduced amount of filler, which it may even entirely displace. These materials will be combined in the usual way and may be molded and vulcanized with the present equipment and methods.

Vehicle tires having a tread surface of this new composition not only will withstand long wear, but owing to the presence of the fly ash has much less tendency to slip or skid, even when worn apparently smooth, than tires with treads of the present compositions and compounds. Furthermore, since fly ash is of much less weight than the ordinary fillers, a reduction in the weight of the tire results.

Where in the specification and claim the term "paint" is employed, this is understood to mean any liquid or semi-liquid material which may be applied by brushing, spraying, or in other suitable manner to form a thin layer of coating or covering material. Where also the term "rubber" is used, this is to be taken to include reclaimed as well as crude rubber, and also synthetic or artificial rubber and the various rubber substitutes such, for example, as guayule.

Having thus described the invention, what is claimed is:

A heat resistant coating composition consisting of approximately 45% by weight of fly ash, 8% pentaerythritol abietate, 8% dehydrated castor oil, 2% lead acetate, 6% of sixteen percent lead naphthenate in mineral spirits, 3% of four percent cobalt in mineral spirits, 10% mineral spirits, and 18% V. M. & P. naphtha.

WILLIAM A. MACFARLAND.
CHARLES H. CUTTER.

REFERENCES CITED

The following references are of record in the file of this patent:

UNITED STATES PATENTS

| Number | Name | Date |
|---|---|---|
| 2,310,200 | Callis | Feb. 9, 1943 |
| 2,268,759 | Martin | Jan. 6, 1942 |
| 507,745 | Moore | Oct. 31, 1893 |
| 304,124 | O'Neill | Aug. 26, 1884 |

OTHER REFERENCES

Pentalyn A and Pentalyn G Varnishes, Hercules Powder Co. (booklet), March 1942, page 12.

Physical and Chemical Examination of Paints, Varnishes, Lacquers and Colors, Gardner, 9th edition, page 520.